(12) United States Patent
Nakamura (10) Patent No.: US 7,021,512 B1
(45) Date of Patent: Apr. 4, 2006

(54) STAPLE, AND STAPLER FOR THE STAPLE

(75) Inventor: Youzou Nakamura, Saitama (JP)

(73) Assignee: Yuriko Nakamura, Saitama (JP)

( * ) Notice: Subject to any disclaimer, the term of this patent is extended or adjusted under 35 U.S.C. 154(b) by 141 days.

(21) Appl. No.: 10/433,209

(22) PCT Filed: Nov. 16, 2001

(86) PCT No.: PCT/JP01/10031

§ 371 (c)(1),
(2), (4) Date: Jul. 28, 2003

(87) PCT Pub. No.: WO02/44572

PCT Pub. Date: Jun. 6, 2002

(30) Foreign Application Priority Data

Nov. 30, 2000 (JP) .............................. 2000-364084

(51) Int. Cl.
*B27F 7/00* (2006.01)

(52) U.S. Cl. ........................ 227/76; 227/120; 227/134

(58) Field of Classification Search .................. 227/71, 227/76, 82, 120, 134, 154, 155
See application file for complete search history.

(56) References Cited

U.S. PATENT DOCUMENTS

| | | | | |
|---|---|---|---|---|
| 2,181,904 A | * | 12/1939 | Maynard et al. | 227/155 |
| 3,119,115 A | * | 1/1964 | Bello | 227/67 |
| 3,319,863 A | * | 5/1967 | Dritz | 227/71 |
| 3,757,629 A | * | 9/1973 | Schneider | 411/443 |

FOREIGN PATENT DOCUMENTS

| | | | |
|---|---|---|---|
| JP | 53-43286 A | | 4/1978 |
| JP | 57-52239 B2 | | 11/1982 |
| JP | 60-94279 A | | 5/1985 |
| JP | 4-45675 | | 4/1992 |
| JP | 3052962 U | | 10/1998 |
| JP | 11-277460 A | | 10/1999 |
| JP | 11-277932 A | | 10/1999 |
| JP | 11277460 A | * | 10/1999 |
| JP | 11-347966 A | | 12/1999 |
| JP | 2001-300865 A | | 10/2001 |

* cited by examiner

*Primary Examiner*—Louis K. Huynh
*Assistant Examiner*—Chukwurah Nathaniel
(74) *Attorney, Agent, or Firm*—Weiner & Burt, P.C.; Irving M. Weiner; Pamela S. Burt (57) ABSTRACT

A stapler having a staple magazine 3 for storing adhesive-coated staples. The staple is bent at its legs by being firmly held between a pressing plate and a matrix anvil, heat from an electric heater inside the anvil is transmitted to the adhesive to fuse the adhesive, and documents are bound by the staple with enhanced adhesive strength.

3 Claims, 5 Drawing Sheets

STAPLE, AND STAPLER FOR THE STAPLE

BACKGROUND OF THE INVENTION

1. Field of the Invention

The present invention relates to a staple and a stapler for the staple and, more particularly, to a soft staple made of material such as paper and the like, and a stapler suitable for use with the soft staple.

2. Description of the Related Art

Conventionally, to bind documents and the like, a thin metal staple having a straight main body and legs bent substantially at the right angles at both sides of the main body is used, and an exclusive stapler for providing the metal staple is widely used.

As this staple is made of metal, when the bound documents became no longer needed and are desired to be recycled, it is necessary to remove the staple before letting the documents to recycle processing. When the bound documents are cut with a shredder to protect the secret, the staple has to be removed before the cutting is performed, for the staple damages the cutting edges of the shredder. Further, if the removed staple is left on the floor, it can be an unexpected dangerous article.

In view of these points, the applicant of the present application has earnestly proceeded with the research, and has developed a staple made of material such as paper and the like.

However, in case of the staple made of material such as paper and the like, it may be possible to give the staple with strength to some degree subject to strengthening process, but would be insufficient to keep the bound documents only by the tip ends of the bent legs of the staple. Thus, it is necessary to provide an idea of coating inner surfaces of the staple legs with an adhesive, which are in contact with the back surface of the bound documents. In this connection, use of a so-called hot-melt type of adhesive is usable, but would have to be heated via paper material of the substrate for the staple. Thus, it is necessary to provide an idea how to fuse the adhesive quickly and sufficiently. Further, it should be considered that even if the strength to some degree can be given to the soft staple, it is impossible to penetrate documents to be bound with the staple itself of paper material unlike a metal staple.

Accordingly, the stapler using the staple of paper material requires consideration to how to make the best use of a selected type of adhesive to be used, and to how to bind documents reliably.

The present invention has been made in view of these problems, and has an object to provide a staple made of a paper material using a hot-melt type adhesive which is capable of fusing quickly when heat is added, and a suitable stapler for the use with the paper staple.

In order to solve the above-described problems, the present invention provides a staple having a gain body extending flat and straight, and legs bent substantially at right angles at both ends of the main body and opposed to each other, wherein the substrate of the staple is made of paper material, a hot-melt type adhesive being coated on opposing inner surfaces of the legs, and a plurality of through-holes being formed in each of the legs in an area coated with the adhesive. The paper material constituting the substrate of the staple includes a vulcanized fiber. The present invention also provides a stapler having a staple magazine for storing staples therein which has a bottom wall, both side walls provided upright along both side edges in a longitudinal direction of the bottom wall to oppose each other, and an end wall vertically provided on at least a front end in the longitudinal direction of the bottom wall, and in which an opening for allowing the staple to pass through is formed in the bottom wall at a position close to the front end wall, the staple magazine including biasing means for biasing the staples toward the front end of the bottom wall. The stapler further comprises an upper lever which is pivotally connected at its rear end to a rear end of the staple magazine, and has a pressing member for pressing the staple located above the opening in the bottom wall of the staple magazine to force the staple out of the opening. The stapler further comprises a base which includes a base plate placed under the staple magazine and connected to the staple magazine, and a matrix anvil placed on the base plate at a position corresponding to the opening of the staple magazine for receiving legs of the staple pressed out of the opening and guiding the legs to be bent in predetermind directions. The upper lever is provided with cutters mounted on the pressing member and extending downward along both side surfaces of the pressing member beyond the lower end of the pressing member and having cutting edges at lower ends thereof. The stapler further comprises heating means for heating the matrix anvil, and a document lifting spring located between the staple magazine and the matrix anvil, fixed at its one end to the base plate and including a resilient document support in which an opening for allowing the cutters to extend through is formed.

SUMMARY OF THE INVENTION

In a paper staple according to the present invention, a hot-melt type adhesive is coated on inner surfaces of legs, and a plurality of small holes are provided in the legs in areas coated with the adhesive. Accordingly, when the legs are bent and heat is applied to them from their outer surfaces, the heat is directly transferred to the adhesive via the small holes, the adhesive fuses quickly and sufficiently, and the legs of the staple are adhered on the back surface of the bound documents quickly with sufficient strength, thus making it possible to bind the documents in an extremely short time with reliability.

In a stapler according to the present invention, holes are provided in the documents to be bound with cutters, and the legs of the staple are smoothly introduced into the holes while the legs are being guided by the cutters. After the legs are introduced into the holes by the sufficient length, bending of the legs is started, and therefore the legs of the staple are bent in a predetermined reliable manner, thus making it possible to bind the documents with reliability.

DETAILED DESCRIPTION OF THE PREFERRED EMBODIMENTS

An embodiment of the present invention will be explained based on the drawings, but the scope of the present invention is not limited to the embodiment.

Figure 1:
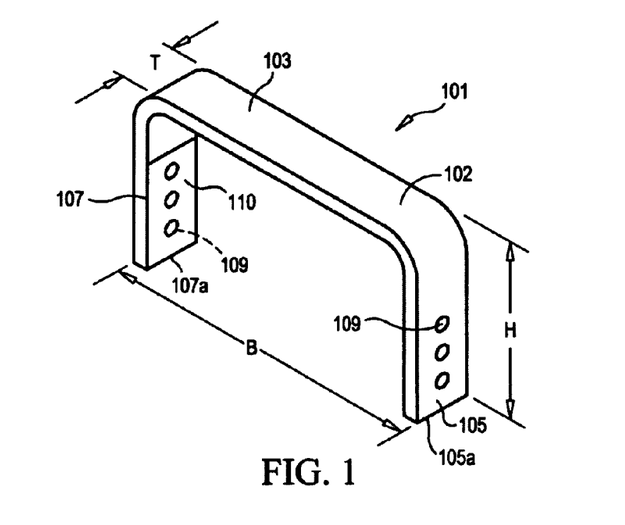
FIG. 1 is a perspective view of a staple according to an embodiment of the present invention.

FIG. 1 is a perspective view of a staple 101 according to the embodiment of the present invention. The staple 101 is made of paper and the like, and in this embodiment, the paper material constituting the substrate of the staple includes a vulcanized fiber composed of a vegetable fiber such as a plate-shaped cotton fiber and wood fiber which is obtained by immersing sheets of cotton, hemp, wood pulp and the like in a zinc chloride solution to give tackiness to surfaces of the sheet materials, overlaying several sheets of the immersed materials and subjecting them to rollers to be compressed to be the plate-shaped vulcanized fiber.

In this specification, such a vulcanized fiber and similar materials are included in the concept of "paper material". The shape of a staple 101 is defined by a strip of substrate 102 having a predetermined width and thickness. As shown in FIG. 1, the staple 101 includes a main body 103 extending horizontally to be flat, and legs 105 and 107 which are bent substantially at right angles at both end of the main body 103, and extend to oppose to each other.

The width, thickness, and height of the staple are indicated in FIG. 1 by the letters B, T, and H. Opposing inner surfaces of the legs 105 and 107 are coated with hotmelt type of adhesives 110 having thermal fusibility from tip ends 105a and 107a up to predetermined level.

Small through-holes 109 are formed in the legs 105 and 107 in an area coated with the adhesives 110. The staples 101 are formed so that a plurality of staples may be continuously connected as conventional metal staples with cuts provided between the adjacent staples 101 for being easily separated from one another when they are used.

Figure 2:
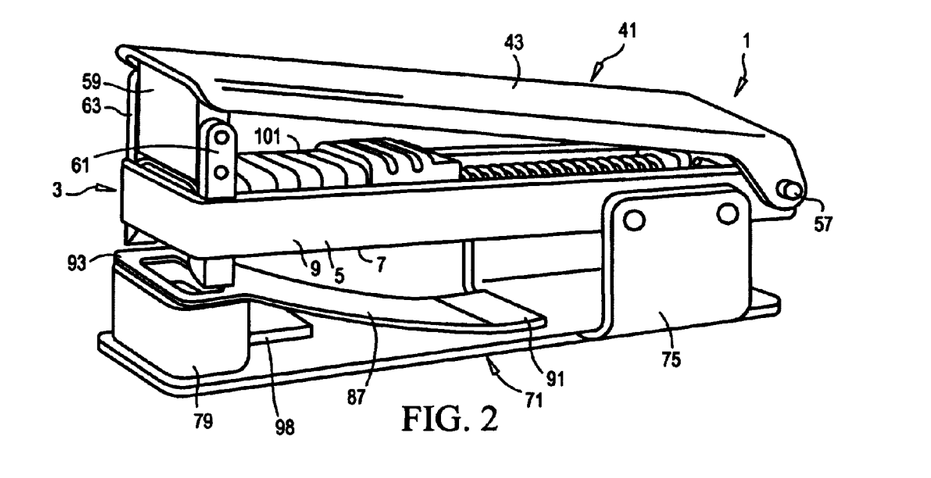
FIG. 2 is a perspective view of a stapler according to the embodiment of the present invention.
Figure 3:
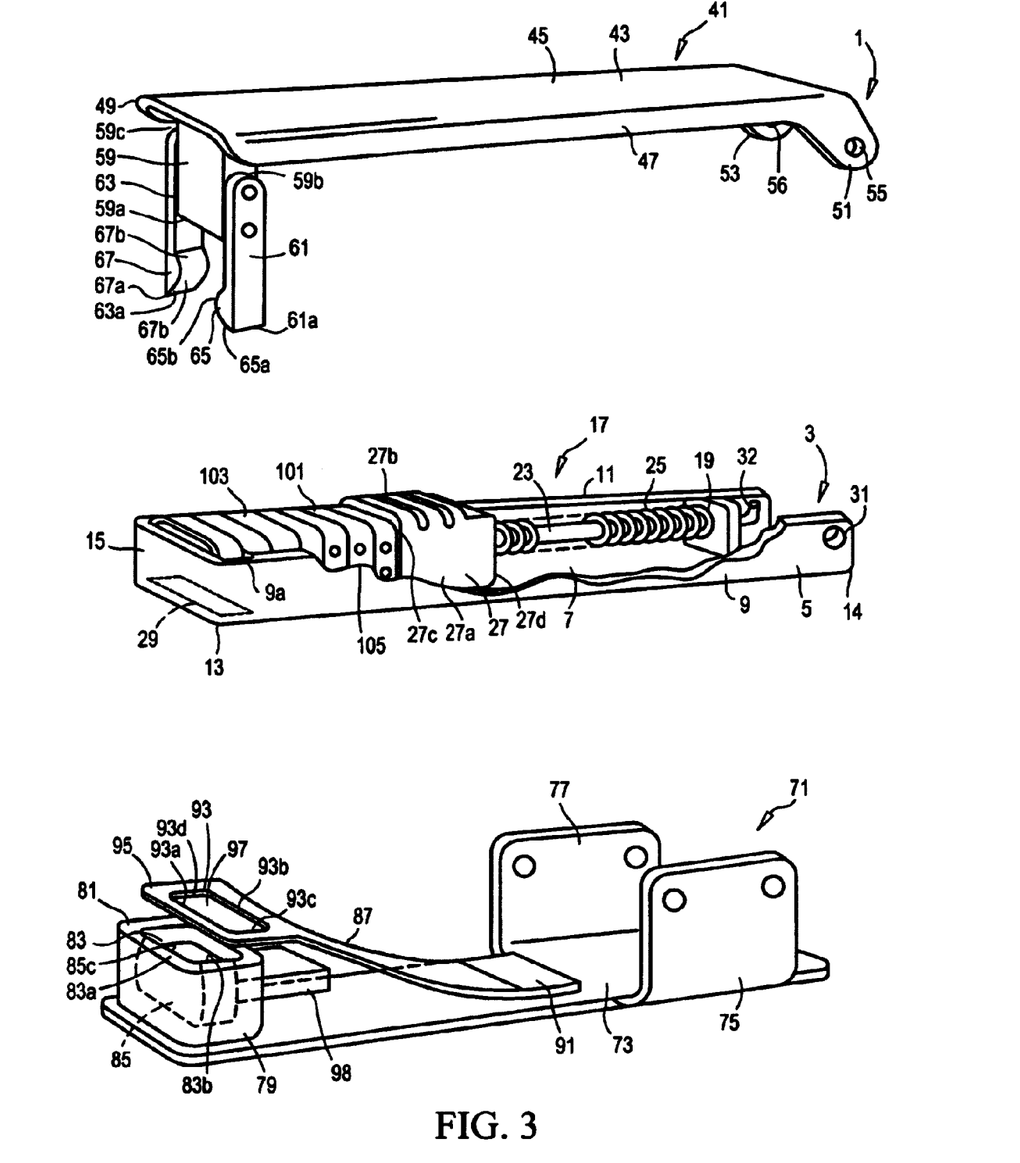
FIG. 3 is an exploded perspective view of the stapler in FIG. 2.

FIG. 2 is a perspective view of a stapler 1 according to a concrete embodiment of the present invention and FIG. 3 is an exploded perspective view thereof. The stapler 1 is constructed by a staple magazine 3 housing a plurality of staples 101 in a continuous state, an upper lever 41 including a member for pressing an outer surface of the main body 103 extending between the two legs 105 and 107 of the staple to press the staple out of the magazine 3 as will be described later, and a base 71 including a member for receiving and bending the legs 105 and 107 of the staple 101 which is pressed out of the staple magazine 3, as will be described later.

The staple magazine 3 includes a magazine case 5 of which the upper side is opened, and which houses a plurality of staples 101 therein in the continuous state. Below, for convenience of explanation, the explanation is made with the left side in the drawing as a front, the right side as a rear, the lower side as left, and the upper side as right, but they do not limit the present invention at all.

The magazine case 5 is formed to be elongate, and includes a bottom wall 7, and right and left side walls 9 and 11 which are upright to oppose each other along both sides or right and left edges in a longitudinal direction of the bottom wall. An end wall or a front wall 15 is formed upward from the bottom wall 7 and extends between front ends of the right and left side walls 9 and 11 at one end or a front end 13 of the magazine case 5.

In any alternative embodiment, however, it is not necessary to close between the right and left side walls 9 and 11 completely, and it is sufficient if the front side surface of the staple 101 is received at this portion and prevented from coming off from here.

The other end, namely, a rear end 14 of the magazine case 5 is opened in this embodiment. A distance between inner surfaces of the right and left side walls 9 and 11 is determined correspondingly to a width B of the staple 101 so as to guide movement of the staple 101 in the magazine case 5 in the longitudinal direction of the case. Vertically extending grooves 9a and 11a are formed at the front ends of the right and left side walls 9 and 11, each having a width substantially corresponding to the thickness T of one staple from the inner surface of the front wall 15, as shown in a partially enlarged plane view in FIG. 4. The distance between the right and left side walls 9 and 11 is larger in this portion than the other portion. It should be noted that when guides of the staple 101 is formed by bending upper ends of the right and left side walls 9 and 11 inward to be close to each other, it is necessary to form notches in the guides corresponding to the grooves 9a and 11a. This staple magazine 3 can be used in the conventional stapler that is used with the conventional metal staples.

Staple biasing means 17 is provided for biasing the staples 101 to the front end 13 or the front wall 15 of the magazine case 5. Namely, a rod support rear pirate 19 that is a plate-shaped member is secured to the bottom wall 7 at a position a little forward from the rear end 14 of the magazine case 5 as shown in the drawing.

Though not shown in the drawing because it is hidden by the staple, a rod support front plate 21 is provided near the front end 13 of the magazine case 5 and, more specifically, inside of a third staple from the front in this embodiment. A rod 23 extends with its both ends supported by the support plates 19 and 21. Reference numeral 27 denotes a slider, which is guided at both side surfaces 27a and 27b thereof by the side walls 9 and 11 to be longitudinally movable in the magazine case 5.

Figure 4:
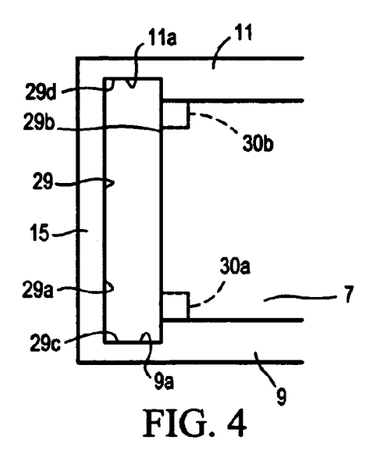
FIG. 4 is a partial enlarged plane view of a magazine case.

A coil spring 25 is wound around the rod 23, its one end abuts to a rear side surface 27d of the slider 27, and the other end is received by the rear plate 19. Accordingly, a forward force always acts on the slider 27 and makes a front side surface 27c of the slider 27 abut to a rear side of the last staple, to bias all the staples toward the front wall 15. An opening 29, through which the staple 101 is pressed out, is formed in the bottom wall 7 of the magazine case 5 adjacent to the front wall 15, which is also the same structure as the conventional stapler. The shape of the opening 29 is rectangular as shown in the drawing, and its longitudinal edge 29a substantially corresponds to an inner surface of the front wall 15, and right and left edges 29c and 29d correspond to the grooves 9a and 11b formed in the right and left side walls 9 and 11 (FIG. 4).

A longitudinal width (width in the longitudinal direction of the magazine case 5) of this opening 29 corresponds to a thickness T of the staple 101.

The upper lever 41 includes a main body 43 formed to be elongate. The main body 43 includes a flat center 45 extending in the longitudinal direction, and right and left bent edges 47 and 49 bent along the longitudinal direction of the center 45. Fitting tongues 51 and 53 extend downward and rearward at rear ends of the bent edges 47 and 49. Holes 55 and 56 are provided in the fitting tongues 51 and 53. These holes 55 and 56 conform to holes 31 and 32 provided near rear ends of the right and left side walls 9 and 11 of the magazine case 5. The upper lever 41 is pivotally connected to the magazine case 5 with use of a shaft 57 (FIG. 2).

A pressing plate 59, which is substantially square-shaped, is fixedly mounted near a front end of the main body 43 of the lever 41 as a member for pressing the staple. Its lengthwise width (width in the longitudinal direction of the lever main body 43) and its lateral width (width in a direction perpendicular to the longitudinal direction of the lever main body 43) are substantially equal to the thickness T and the width B of the staple 101, respectively.

A lower surface 59a of the pressing plate 59 is positioned above the staple 101 standing at the forefront in the magazine case 5. When the upper lever 41 is rotated in a counterclockwise direction, it presses the staple 101 at the forefront and forces it out through the opening 29. A pair of cutters 61 and 63 are fixed to side surfaces 59b and 59c of the pressing plate 59 in such a manner to oppose each other by appropriate means such as spot welding. Namely, the cutters 61 and 63 are fixed to and move integrally with the upper lever main body. The widths of the cutters 61 and 63 (the width in the longitudinal direction of the upper lever main body 43) are substantially equal to the lengthwise width of the pressing plate 59.

The cutters 61 and 63 extend downward beyond the lower surface 59a of the pressing plate 59, and include, at their lower tip end, cutting edges 61a and 63a extending in the longitudinal direction of the upper lever 41. Protuberances 65 and 67 substantially triangular in section are formed at inner surface of the cutters 61 and 63 near lower ends thereof to oppose each other. A distance between tops 65b and 67b of the protuberances 65 and 67 is shorter than the lateral width of the pressing plate 59. Cutting edges may be also formed at both side edges of slant surfaces 65a and 67a of the lower sides of the triangular protuberances 65 and 67.

A base 71 includes an elongate flat base plate 73. Length and width of the base plate 73 are substantially equal to the length and the width of the magazine case 5. At a position near the rear end of the base plate 73, supports 75 and 77 are formed to rise substantially perpendicularly upward along the right and left side edges. Portions near upper ends of the supports 75 and 77 and substantially middle portions in the vertical direction of the right and left side walls 9 and 11 of the magazine case 5 are fixed by appropriate means such as spot welding, whereby the magazine case 5 is fixed to the base 71. A cutting edge cover 79 is fixedly placed near a front end of the base plate 73. The cutting edge cover 79 takes the shape of a small and hollow box in this embodiment. This cutting edge cover 79 allows the cutters 61a and 63a to displace away from each other in operation as will be described later. The cutting edge cover 79 protects the cutting edges 61a and 63a.

A substantially rectangular opening 83 is formed in the center of an upper wall 81 of the cutting edge cover 79. Inside the hollow cutting edge cover 79, a matrix anvil 85 is placed in alignment with the opening 83 for receiving tip ends and bending in desired directions the legs 105 and 107 of the staple 101 which moves downward through the opening 29 of the magazine case 5 and an opening 97 in a spring that will be described later.

A staple receiving surface 85c is formed on a top surface on the matrix anvil 85 as shown in FIGS. 5 and 6. The receiving surface 85c includes a flat center 85d and upwardly inclined surfaces 85e and 85f formed at both sides of the center 85d and extending outwardly to the tops 85a and 85b. Right and left side surfaces 85g and 85h of the matrix anvil 85 include swells 85j and 85k adjacent to the tops 85a and 85b.

An electric heater 100 is embedded in the matrix anvil 85 directly under the staple receiving surface 85c at the upper end of the matrix anvil 85.

An electric power supply and a thermostat not shown are connected to the electric heater 100, and are placed in a casing 98 which extends substantially in parallel with an upper plane of the base plate 73 from a rear end of the matrix anvil 85. The casing 98 is mounted to penetrate through and protrudes from the cutting edge cover 79. The matrix anvil 85 has thermal conductivity, and a heat insulating material 99 is provided between the anvil 85 and the base plate 73.

Reference numeral 87 denotes a document lifting spring which takes the shape of an elongate thin plate. The lifting spring 87 is fixed to the base plate 73 at its rear end 91, in the vicinity of the front ends of the supports 75 and 77, and extends in a direction toward a tip end of the base plate 73.

The spring 87 is inclined obliquely upward, and its front end is bent to extend substantially in parallel with the upper wall 81 of the cutting edge cover 79 to form a resilient document support 93. Lateral widths (widths in the direction orthogonal to the longitudinal direction of the base plate 73) of the lifting spring 87 and the document support 93 are longer than the lateral width of the cutting edge cover 79, and shorter than the lateral width of the base plate 73. Lengthwise the width of the document support 93 (width in the longitudinal direction of the base plate 73) is substantially equal to the lengthwise width of the cutting edge cover 79. The document support 93 is located between the upper wall 81 of the cutting edge cover 79 and the bottom wall 7 of the staple magazine 3, and a distance between the document support 93 and the right and left tops 85a and 85b of the matrix anvil 85 are substantially equal to lengths of the legs 105 and 107 of the staple 101 combined with the thickness of the document support. An upper surface 95 of the document support 93 receives documents. An opening 97 through which the staple 101 extends is formed in the document support 93. As shown in the drawing, the shape of the opening 97 in the center of the document support 93 is rectangular. Its front edge 93a substantially matches with a front edge 83a of the opening 83 in the cutting edge cover 79, and its rear edge 93b substantially matches with a rear edge 83b of the opening 83 likewise. Lengthwise the width of the opening 97 (width in the longitudinal direction of the base plate 73) and lateral width (width in the direction orthogonal to the longitudinal direction of the base plate 73) substantially match with lengthwise width and lateral width of the opening 29 formed in the bottom wall 7 of the magazine case 5, respectively.

Next, with reference to FIG. 5 and FIG. 6, an operation of the stapler 1 will be explained. These figures show the stapler 1 as viewed from the front side. (A) in FIG. 5 corresponds to the state shown in FIG. 2. Namely, the staple 101 is sandwiched between the cutters 61 and 63, and is located under the pressing plate 59 and above the protuberances 65 and 67 of the cutters 61 and 63. Tip ends of the cutters 61 and 63 protrude downward from the opening 29 of the bottom wall 7 of the magazine case 5. In this embodiment, when the main body 43 of the upper lever 41 is moved to open in the clockwise direction from the position shown in FIG. 2 to set the staples 101 in the magazine case 5 while a number of the staples are connected, and then the upper lever 41 is turned in the opposite direction to return to the position shown in FIG. 2, the stapler become usable, but in this state, the staple 101 located at the head and urged against the front wall 15 of the magazine case 5 is pressed out downward through the opening 29 by the protuberances 65 and 67 of the cutters 61 and 63. In this connection, a means can be provided for keeping the staples 101 set in a continuous state back from forward movement by a space for one staple. For example, notches 30a and 30b can be formed in the vicinity of the right and left end of the rear edge 29b of the opening 29 as shown by dotted line in FIG. 4, and stop pins are provided to project upward from the notches 30a and 30b. In this case, the pins may be released from projection after the staples 101 are set and the upper lever 41 is returned to the state in FIG. 2. When the pins are released from projection, the staple 101 at the forefront moves forward to go into the state shown in FIG. 2. When the upper lever 41 is moved to rotate in the counterclockwise direction in FIG. 2 while the front end moves downward, the pressing plate 59 and the cutters 61 and 63 move downward together. The pressing plate 59 presses the staple 101 downward, while the cutters 61a and 63b are moving downward to cut into the documents 111 placed on the upper wall 95 of the document support 93, and the protuberances 65 and 67 follow the cutters 61a and 63a. At this time, a downward force acts on the document support 93 by a force resisting to the pressing force to cut the documents 111, to thereby slightly move the document support 93 downward [FIG. 5(B)].

When the upper lever 41 is further rotated counterclockwise, the cutters 61 and 63 open holes 117 and 119 through the documents while forming downward folds 113 and 115, and lower tip ends of the legs 105 and 107 of the staple 101 go into the holes 117 and 119, respectively. At this time, because the holes 117 and 119 are opened, the resisting force of the documents 111 against the cutting force ceases, and the document support 93 moves upward by the restoring force of the spring 87 to return to the initial position [FIG. 5(C)].

Accordingly, a space substantially corresponding to the length of the legs 105 and 107 of the staple 101 is sufficiently secured between the document support 93 and the matrix anvil 85. When the upper lever 41 is further rotated, the pressing plate 59 is moved downward while the document support 93 is located at the initial position, whereby an inner or lower surface of the main body 103 of the staple 101 is in close contact with a top surface of the documents 111, and the legs 105 and 107 of the staple 101 sufficiently protrude under the documents 111. The folding direction of the folds 113 and 115 of the documents 111 formed downward does not spread over the substantially right angle due to the strength of the cutters 61 and 63 themselves because the legs 105 and 107 of the staple 101 are held by the cutters 61 and 63, respectively. When the upper lever 41 is further rotated, the pressing plate 59 is further moved downward while the document support 93 stands at the initial position. The slant surfaces 65a and 67a on the lower side of the protuberances 65 and 67 of the cutters 61 and 63 abut to the right and left tops 85a and 85b of the matrix anvil 85. When the upper lever 41 is further rotated, the staple 101 is moved downward, and the tip ends of the legs 105 and 107 of the staple abut to the inclined surfaces 85e and 85f of the receiving surface 85c of the matrix anvil 85 [FIG. 5(D)].

Figure 5A:
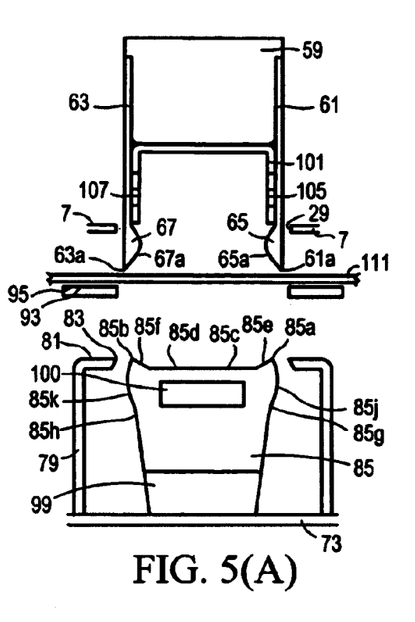
FIG. 5 shows explanatory views of an operation of the stapler according to the present invention.
Figure 5B:
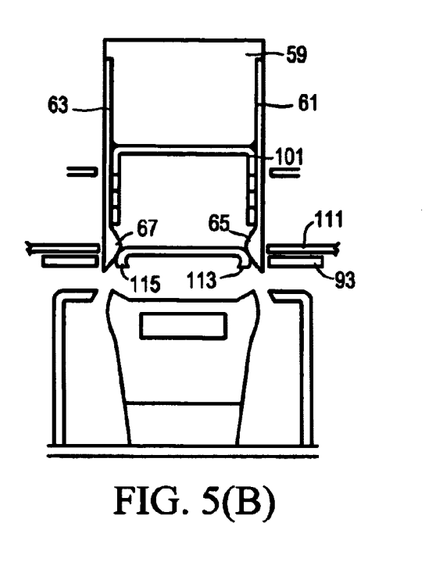
Figure 5C:
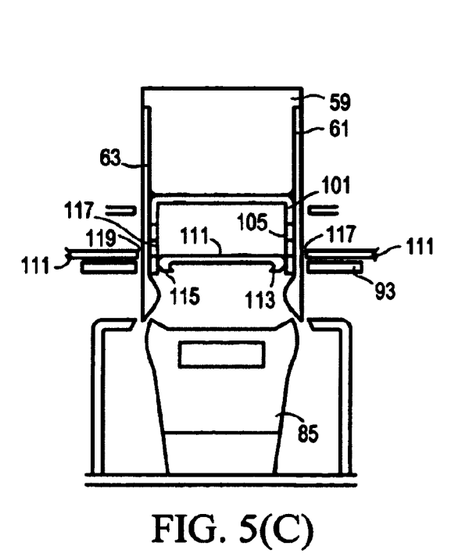
Figure 5D:
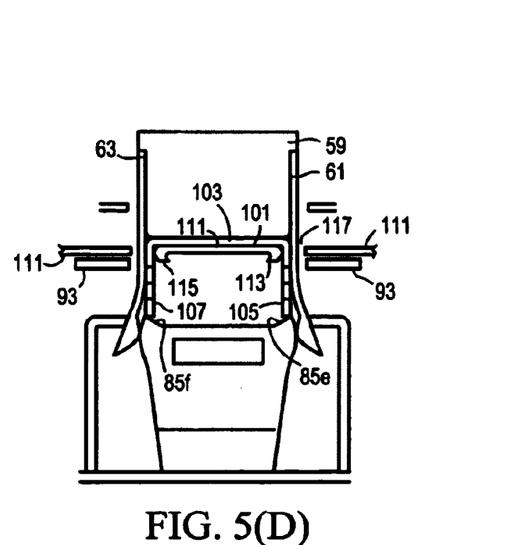

When the staple 101 is further moved downward, the pressing plate 59 is also moved downward together with the staple 101 and the documents 111. The document support 93 is also moved downward along with the documents 111.

As for the cutters 61 and 63, the protuberances 65 and 67 are moved along swells 85j and 85k of the matrix anvil 85, and the lower tip ends 61a and 63a of the cutters 61 and 63 go away from each other. When the staple 101 is further moved downward, the legs 105 and 107 begin to bend in a direction to be close to each other while being guided by the inclined surfaces 85e and 85f and the center 85d [FIG. 6(A)].

Figure 6A:
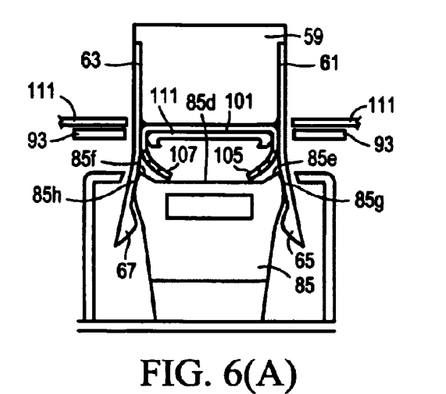
FIG. 6 shows explanatory views of the operation following those of FIG. 5.

When the upper lever 41 is further pressed down, bending of the legs 105 and 107 of the staple 101 is advanced. Then, the legs 105 and 107 are completely bent finally, and the documents 111 and the staple 101 are firmly bound between the pressing plate 59 and the staple receiving surface 85c. At this time, the pressing plate 59 moves to the lowermost position together with the staple 101 and the documents 111. Since the document support 93 is also moved downward together with the documents 111 until the document support 93 contact the upper wall 81 of the cutting edge cover 79. The matrix anvil 85 is heated to the temperature necessary to fuse the hot melt type adhesive 110 coated on the opposing inner surfaces of the staple legs 105 and 107 by the action of the electric heater 100 embedded in the matrix anvil 85 directly under the staple receiving surface.

Figure 6B:
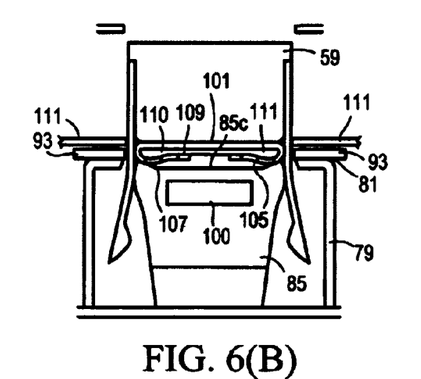
Figure 6C:
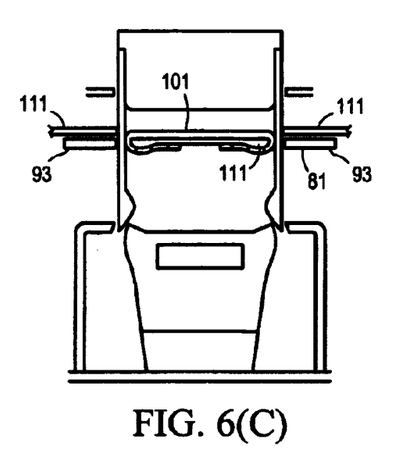
Figure 6D:
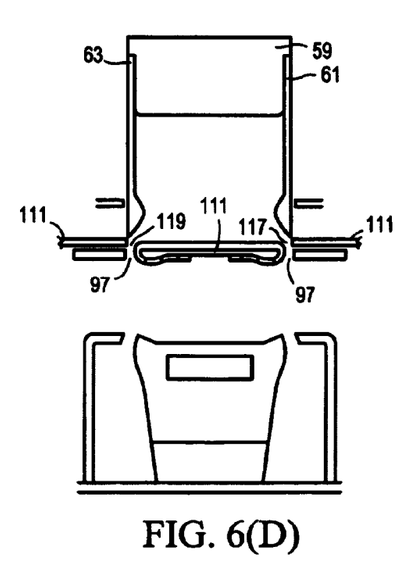

Accordingly, when the staple legs 105 and 107 start to contact the anvil 85 [FIG. 5(D)], heat transfer from the anvil 85 to the legs 105 and 107 begins. In the state as shown in FIG. 6(B), heat transfer is carried out on the entire surfaces of the legs 105 and 107. In this situation, it goes without saying that heat is transferred through the substrate of the staple made of the paper material, but more heat than this is directly transferred to the hotmelt type adhesive 110 through the through-holes 109 provided in the legs 105 and 107, so that the adhesive 110 is fused extremely quickly and sufficiently. Consequently, adhesiveness of the adhesive 110 increases, and as the result, the legs 105 and 107 are firmly adhered to the under surface of the documents 111 to bind the documents 111 [FIG. 6(B)].

Next, when the force for pressing down the upper lever 41 is released, only the upward force works due to the restoring force of the document lifting spring 87, and the document support 93 rises up to the initial position. Consequently, the papers 111 bounded by the staple 101 and placed on the upper wall 81 of the document support 93 are also moved upward to the same position as the document mount 93 [FIG. 6(C)].

When the upper lever 41 is further rotated upwardly in the clockwise direction, the pressing plate 59 and the cutters 61 and 63 are started to rise. When the cutters 61 and 63 go out of the holes 117 and 119 of the documents 111 and return to the original position, the next staple 101 is supplied [FIG. 6(D)]. It should be noted that in this specification, the words, "front", "rear", "right", "left", "upper", "lower" and the like are used for the stapler and each of its component, but they are used to facilitate understanding, and they do not mean any limitation.

As explained thus far, the staple and stapler according to the present invention are useful for the purpose of providing the characteristics suited for recycling the documents in mixed state with staples for the sake of savings of resources, and for the purpose of displaying images. They can be expected to use in the field to which the staples have not been adapted yet, by adjusting the characteristics of the paper material for the substrate of the staple and of the adhesive.

What is claimed is:

1. A stapler comprising:
   a staple magazine for storing staples therein including a bottom wall having two side edges, side walls provided upright along both said side edges in a longitudinal direction of said bottom wall to oppose to each other, and an end wall provided upright on at least a front end in the longitudinal direction of said bottom wall, an opening formed at a position close to said end wall at said front end of said bottom wall for allowing said staple to pass through, and biasing means for biasing said staples toward said front end;

an upper lever pivotally connected at its rear end thereof to a rear end of said staple magazine, and provided with a pressing member for pressing one of said staples located above said opening of said staple magazine to force said staple out of said opening; and a base including a base plate placed under said staple magazine and connected to said staple magazine, and a matrix anvil placed on the base plate at a position opposing to said opening of said staple magazine, receiving legs of said staples pressed out of said opening, and guiding said legs to bend in predetermined directions;

wherein cutters are rigidly mounted on said upper lever to extend downward along side surfaces of said pressing member beyond a lower end of said pressing member and including cutting edges at lower ends thereof;

said stapler further comprising means for heating said matrix anvil, and a document lifting spring fixed at one end thereof, said document lifting spring being located between said base and said matrix anvil, and provided with a resilient document support having an opening for allowing said cutters to extend through.

2. A stapler according to claim 1, wherein said matrix anvil comprises cutter guides for guiding lower tip ends of said cutters to lead said lower tip ends of said cutters to move away from each other.

3. A stapler according to claim 2, wherein said cutters are provided with protuberances protruding inwardly in the vicinity of lower ends of said cutters on inner surfaces of said cutters opposing to each other, and when said cutters lower to a predetermined position, lower slant surfaces of said protuberances abut to edges at upper ends on both sides of said matrix anvil, whereby said cutters are displaced away from each other.

* * * * *